United States Patent
Cook

(10) Patent No.: US 9,304,882 B2
(45) Date of Patent: Apr. 5, 2016

(54) MULTI-STAGE APPLICATION LAYER TEST PACKET GENERATOR FOR TESTING COMMUNICATION NETWORKS

(71) Applicant: BreakingPoint Systems, Inc., Austin, TX (US)

(72) Inventor: Brent A. Cook, Pflugerville, TX (US)

(73) Assignee: BreakingPoint Systems, Inc., Austin, TX (US)

(*) Notice: Subject to any disclaimer, the term of this patent is extended or adjusted under 35 U.S.C. 154(b) by 203 days.

(21) Appl. No.: 13/793,095

(22) Filed: Mar. 11, 2013

(65) Prior Publication Data

US 2014/0258781 A1    Sep. 11, 2014

(51) Int. Cl.
G06F 11/263 (2006.01)
H04L 29/08 (2006.01)

(52) U.S. Cl.
CPC ........ *G06F 11/263* (2013.01); *H04L 29/08072* (2013.01); *H04L 69/32* (2013.01)

(58) Field of Classification Search
CPC .............................. G06F 11/263; H04L 43/50
USPC ................. 370/241, 242, 244, 252, 401, 473; 709/224
See application file for complete search history.

(56) References Cited

U.S. PATENT DOCUMENTS

| | | | |
|---|---|---|---|
| 6,310,892 B1* | 10/2001 | Olkin ............................. | 370/473 |
| 6,560,648 B1* | 5/2003 | Dunn et al. .................... | 709/224 |
| 6,721,276 B1 | 4/2004 | Kher et al. | |
| 7,418,492 B1* | 8/2008 | Cohen et al. .................. | 709/224 |
| 7,515,585 B2 | 4/2009 | Rittmeyer et al. | |
| 7,616,563 B1* | 11/2009 | Eiriksson et al. ............. | 370/230 |
| 7,933,220 B2 | 4/2011 | Hatley et al. | |
| 8,149,730 B1 | 4/2012 | Aybay et al. | |
| 8,310,952 B2 | 11/2012 | Hatley et al. | |
| 8,576,713 B2 | 11/2013 | Kamerkar et al. | |
| 2008/0137543 A1* | 6/2008 | Mitra ............................. | 370/242 |
| 2010/0008233 A1* | 1/2010 | Ee et al. ........................ | 370/241 |
| 2011/0022700 A1 | 1/2011 | Ramanath et al. | |
| 2014/0079074 A1* | 3/2014 | Tune et al. .................... | 370/401 |

OTHER PUBLICATIONS

BreakingPoint, "Optimize and Harden IT Infrastructure Resiliency", At a Glance, 2 pgs. (Mar. 2012).
BreakingPoint, "BreakingPoint FireStorm One", Data Sheet, 4 pgs. (May 2012)).
BreakingPoint, "Optimize and Harden Enterprise IT Resiliency", At a Glance, 2 pgs. (Dec. 2012).

* cited by examiner

*Primary Examiner* — Brian D Nguyen
*Assistant Examiner* — Toan Nguyen
(74) *Attorney, Agent, or Firm* — Egan, Peterman, Enders & Huston LLP.

(57) ABSTRACT

Systems and methods are disclosed for generating application layer test packets for testing packet communication networks. The disclosed embodiments utilize multi-stage application layer test packet generator to generate high volumes of network layer test packets in an efficient and cost effective manner. A first co-processor generates tokenized test packets that include non-application layer content and include token values representing desired application layer content. A second co-processor analyzes the token values and replaces the token values with stateful application layer content associated with the token values. Once devices-under-test (DUTs) have received and processed the application layer test packets, the DUTs generate return packets that include stateful application layer content. These return packets are then received and processed by the multi-stage application layer test packet generator.

28 Claims, 8 Drawing Sheets

MULTI-STAGE APPLICATION LAYER TEST PACKET GENERATOR FOR TESTING COMMUNICATION NETWORKS

TECHNICAL FIELD OF THE INVENTION

This invention relates to generation of application layer test packets for testing communication systems.

BACKGROUND

Stress testing network infrastructures and network end nodes requires network test equipment that is capable of generating a large number of test packets in a short period time. In situations where a test system is attempting to emulate packets associated with higher-layer application protocols and, therefore, need to contain meaningful application payloads, the processing requirements associated with generating large volumes of test packets can be significant and difficult to achieve. Such network test systems often employ multiple processors working in parallel to meet such high-bandwidth demands for test packets containing meaningful or stateful application-level payloads. Processors, however, are expensive and consume considerable power during operation.

FIG. 1 (Prior Art) is block diagram of an embodiment 100 for a network test system that utilizes multiple network test processors to generate application layer test packets. As depicted, network test processors 102, 104, and 106 generate test packets for testing application layer performance of the communication system. As represented by network test processor 102, a test packet generator 110 uses a flow table 112 to keep track of the state of communication sessions within the communication system and generates application layer test packets 116 using the application layer content 114. The other network test processors 104 and 106 are operating in parallel in a similar fashion to generate additional application layer test packets. The application layer test packets 116 are provided through network interface circuitry 120 to a network 122 and ultimately to the devices-under-test (DUTs) 124, 130, and 132. As represented by application (APP) 126 within DUT 124, the DUTs are running applications that are receiving and responding to the application layer test packets generated by the network test processors 102, 104, and 106. Return application layer test packets are then provided back from the DUTs 102, 104, and 106 through the network 122 and network interface circuitry 120 to the network test processors 102, 104, and 106, as represented by return packets 118.

As indicated above, while multi-processor solutions can be used to generate high volumes of application layer test packets, these multi-processor solutions are expensive and inefficient. Further, multi-processor solutions suffer power consumption problems and require related heat dissipation techniques that make these solutions less efficient and more costly.

SUMMARY OF THE INVENTION

Systems and methods are disclosed for generating application layer test packets for testing packet communication networks. The disclosed embodiments utilize multi-stage application layer test packet generator to generate high volumes of network layer test packets in an efficient and cost effective manner. A first co-processor generates tokenized test packets that include non-application layer content and include token values representing desired application layer content. The first co-processor sends the tokenized test packets to a second co-processor. The second co-processor analyzes the token values and replaces the token values with stateful application layer content associated with the token values. The completed application layer test packets are then forwarded on for use in testing a packet communication network. Once devices-under-test (DUTs) have received and processed the application layer test packets using the applications running on the DUTs, the DUTs generate return packets that include stateful application layer content. These return packets are received by the second co-processor and can be re-tokenized by the second co-processor, if desired, such that tokenized return test packets are sent to the first co-processor. The first co-processor analyzes the return packets and generates additional tokenized test packets depending upon the contents of the return packets. Different features and variations can be implemented, as desired, and related systems and methods can be utilized, as well.

For one embodiment, a method is disclosed for generating test packets including stateful application layer content, including generating a tokenized test packet using a first co-processor where the tokenized test packet include non-application layer content and a token value representing stateful application layer content, forwarding the tokenized test packet to a second co-processor, receiving the tokenized test packet at the second co-processor, forming an application layer test packet using the second co-processor to replace the token value within the tokenized test packet with stateful application layer content associated with the token value, repeating the generating and forwarding steps at the first co-processor to generate a plurality of tokenized test packets, and repeating the receiving and forming step at the second co-processor to form a plurality of application layer test packets.

In other embodiments, the method can include forwarding the application layer test packets to a communication system for use in emulating application layer activity in the communication system. The method can also include utilizing the second co-processor to examine the token value, to use the token value to identify stateful application layer content stored within a data storage system and associated with the token value, and to obtain the stateful application layer content from the data storage system. Further, the data storage system can include memory circuitry external to the second co-processor. In addition, the method can include utilizing the first co-processor to determine stateful application layer content desired for an application layer test packet, to identify a token value associated with the desired stateful application layer content, and to insert the token value into a test packet to form the tokenized test packet. Still further, the method can include utilizing the first co-processor to maintain a flow table, and the flow table can include information concerning active communication sessions for a communication system. Further, the flow table can be stored within a cache memory for the first co-processor.

In further embodiments, the method can include receiving at the second co-processor return test packets from a communication system, and the return test packets can include stateful application layer content and non-application layer content. Further, the method can include generating tokenized return test packets using the second co-processor by replacing stateful application layer content with token values representing the stateful application layer content, and forwarding the tokenized return test packets to the first co-processor. In addition, the method can include analyzing the tokenized return test packets with the first co-processor and generating further tokenized test packets based upon the tokenized return test packets. Still further, the method can include forwarding one or more of the return test packets to the first co-processor without replacing the stateful application layer content with a token value.

In still further embodiments, the method can include sending the return test packets to the first co-processor, analyzing the return test packets with the first co-processor, and generating further tokenized test packets based upon the return test packets. Further, the method can include monitoring packet traffic between the first co-processor and the second co-processor and adjusting ingress and egress bandwidths for the first co-processor based upon the monitoring step. Still further, the monitoring step can be performed in the second co-processor, and the method can further include providing bandwidth control signals from the second co-processor to the first co-processor and utilizing the bandwidth control signals within the first co-processor to adjust the ingress and egress bandwidths for the first co-processor. In addition, the method can include increasing the ingress bandwidth for the first co-processor and decreasing the egress bandwidth for the first co-processor if receive packet traffic for the first co-processor is determined to be backed-up.

For another embodiment, a system is disclosed for generating test packets including application layer content including a first co-processor and a second co-processor. The first co-processor is configured to generate tokenized test packets including non-application layer content and token values representing stateful application layer content and to forward the tokenized packets to the second co-processor. And the second co-processor is configured to form application layer test packets by replacing the token values with stateful application layer content associated with the token values.

In other embodiments, the second co-processor can be further configured to forward the application layer test packets to a communication system for use in emulating application layer activity in the communication system. The second co-processor can be further configured to examine the token values, to use the token values to identify stateful application layer content stored within a data storage system and associated with the token values, and to obtain the stateful application layer content from the data storage system. Further, the data storage system can include memory circuitry external to the second co-processor. In addition, the first co-processor can be configured to determine stateful application layer content desired for application layer test packets, to identify token values associated with the desired stateful application layer content, and to insert the token values into test packets to form the tokenized test packets. Still further, the first co-processor can be configured to maintain a flow table, and the flow table can include information concerning active communication sessions for a communication system. Further, the flow table can be stored within a cache memory for the first co-processor.

In further embodiments, the second co-processor is further configured to receive return test packets from the communication system, and the return test packets can include stateful application layer content and non-application layer content. Further, the second co-processor can be configured to generate tokenized return test packets by replacing stateful application layer content with token values representing the stateful application layer content and to forward the tokenized return test packets to the first co-processor. In addition, the first co-processor can be configured to analyze the tokenized return test packets and to generate further tokenized test packets based upon the tokenized return test packets. Still further, the second co-processor can be further configured to forward one or more of the return test packets to the first co-processor without replacing the stateful application layer content with a token value.

In still further embodiments, the second co-processor can be configured to send the return test packets to the first co-processor, and the first co-processor can be further configured to analyze the return test packets and to generate further tokenized test packets based upon the return test packets. Further, the first co-processor can be further configured to adjust ingress and egress bandwidths for the first co-processor based upon packet traffic levels between the first co-processor and the second co-processor. Still further, the second co-processor can be further configured to monitor the packet traffic levels between the first co-processor and the second co-processor and to provide the bandwidth control signals to the first co-processor. In addition, the second co-processor can be configured to provide bandwidth controls signals to cause the ingress bandwidth for the first co-processor to be increased and to cause the egress bandwidth for the first co-processor to be decreased if receive packet traffic for the first co-processor is determined to be backed-up.

Different features and variations can be implemented, as desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
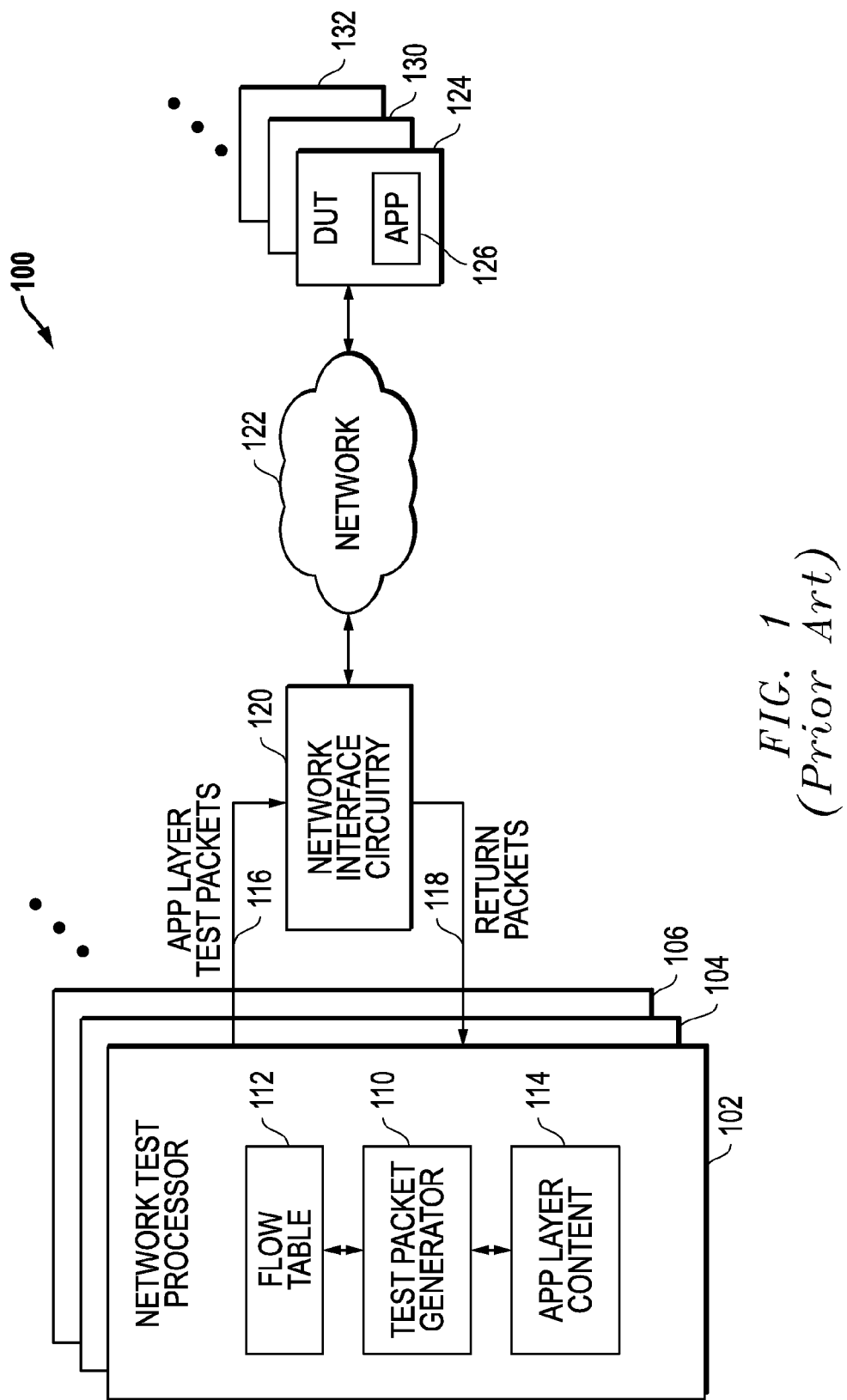
FIG. 1 (Prior Art) is block diagram of an embodiment for a prior network test system that utilizes multiple network test processors to generate application layer test packets.

Systems and methods are disclosed for generating application layer test packets for testing packet communication networks. The disclosed embodiments utilize multi-stage application layer test packet generator to generate high volumes of network layer test packets in an efficient and cost effective manner. A first co-processor generates tokenized test packets that include non-application layer content and include token values representing desired application layer content. A second co-processor analyzes the token values and replaces the token values with stateful application layer content associated with the token values. The completed application layer test packets are then forwarded on for use in testing a packet communication network. Return packets are also received and analyzed by the multi-stage application layer test packet generator. Different features and variations can be implemented, as desired, and related systems and methods can be utilized, as well.

The disclosed embodiments generate test packets that contain meaningful application layer payload content for testing application layer performance in communication systems. To facilitate the rapid generation of high volumes of test packets, the application layer test packets are generated in two-stages. A first test packet co-processor performs the first stage of generating packets with application layer token values. A second test packet co-processor performs the second stage of removing the application layer token values and inserting meaningful or stateful application layer content represented by these token values. For example, at the first stage co-processor, a test packet is generated which includes emulated OSI (Open System Interconnection) layer content from one or more of OSI Layers 1-6 (e.g., L1: physical layer, L2: data link layer, L3: network layer, L4: transport layer, L5: session layer, and/or L6: presentation layer). In addition to this Layer 1-6 information, the first stage co-processor also includes an application layer payload token value representing OSI Layer 7 (e.g., L7: application layer) content to be included within the packet in the second stage. This application layer payload token value is associated with predetermined stateful content for emulated OSI Layer 7 application payload content. The tokenized test packet is then passed to the second stage co-processor. The second stage co-processor is configured to examine the application layer token value, to use the token value to access a data structure that contains corresponding elements of emulated Layer 7 application layer content, and to replace the token value within the test packet with the located stateful application layer content. The completed application layer test packet is then ready for transmission through the communication network being tested to one or more devices-under-test.

It is noted that as used herein stateful application layer content refers to application layer content that represents information within a packet that is used for actual application layer communications and processing for devices-under-test (DUTs) within the communication network being tested. In other words, the DUTs are running one or more internal applications, and these applications are receiving, acting upon, and responding to the application layer content being generated for the test packets. Thus, the application layer content is stateful and is not dummy or "don't care" data. Dummy or "don't care" data can be used, for example, when a payload is needed within a packet but there is no need for data that has any meaning. Thus, rather than being meaningless filler data, the stateful application layer content described herein is meaningful application data that is relevant to the applications being run by the DUTs.

Figure 2:
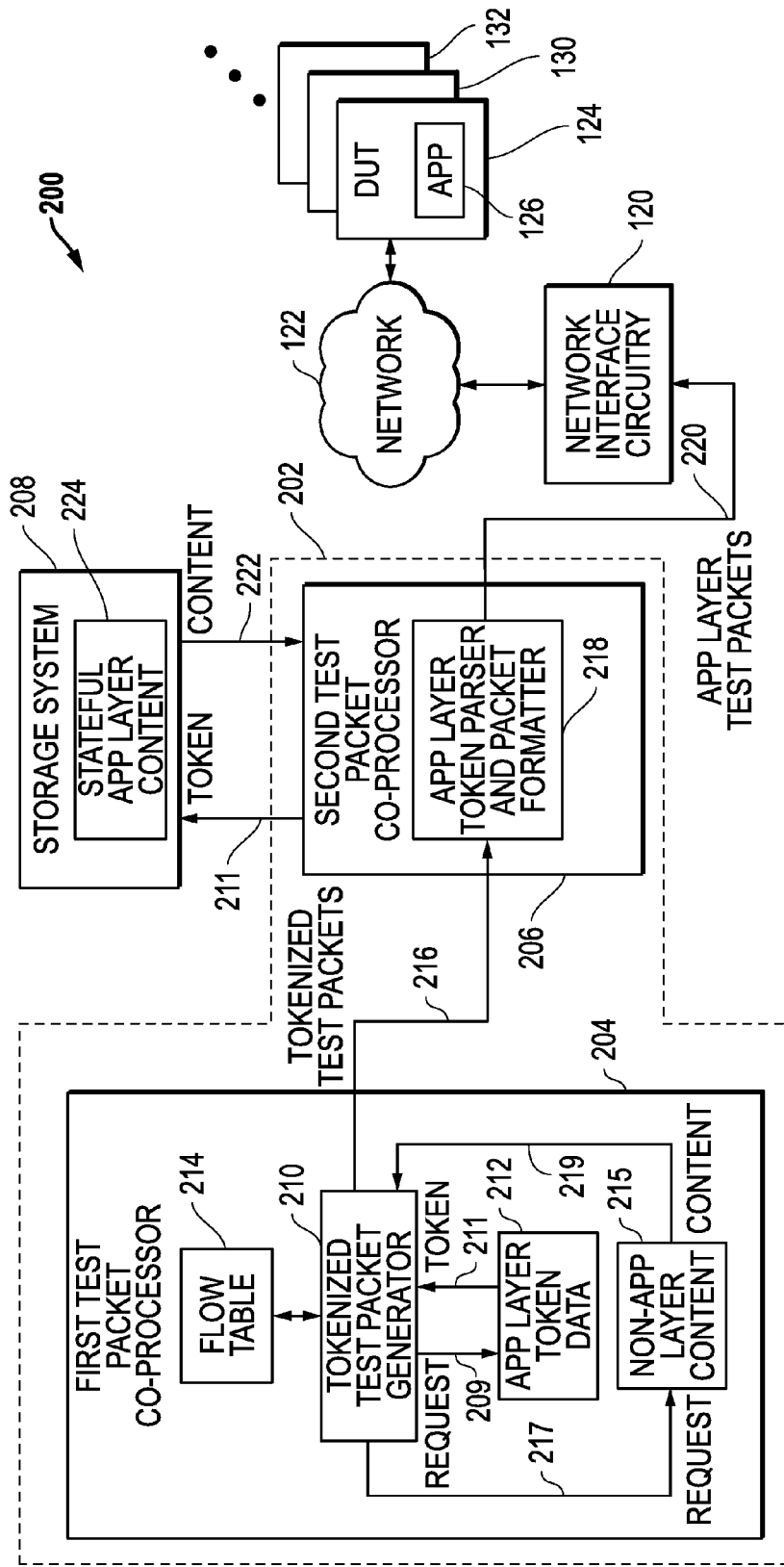
FIG. 2 is a block diagram of an embodiment for a network test system that utilizes a multi-stage test packet generator to generate application layer test packets.

FIG. 2 is a block diagram of an embodiment 200 for a network test system that utilizes a multi-stage test packet processor 202 to generate application layer test packets 220. As depicted, a multi-stage test packet processor 202 includes a first test packet co-processor 204 and a second test packet co-processor 206 that operate together to generate application layer test packets 220. The application layer test packets 220 are provided through network interface circuitry 120 to a network 122 and ultimately to the devices-under-test (DUTs) 124, 130, and 132. As represented by application (APP) 126 within DUT 124, the DUTs are running applications that are interacting with the application layer test packets generated by the multi-stage test packet processor 202.

For the embodiment 200 depicted, the first test packet co-processor 204 includes a tokenized test packet generator 210 that utilizes a flow table 214 to keep track of the state of communication sessions within the communication system. The tokenized test packet generator 210 also utilizes application layer token data 212 and non-application layer content 215 to generate tokenized test packets 216. In particular, the packet generator 210 determines an application layer packet that is desired to be generated with respect to a session within the flow table 214. The packet generator 210 then sends a request 217 to the non-application layer content 215 to receive the desired content associated with one or more of the OSI Layers 1-6. This content 219 is then provided back to the packet generator 210 where it is used to generate a test packet. The packet generator 210 also sends a request 209 to the application layer token data 212 to receive the desired application layer token that represents the application layer content that is desired to be added to the test packet. The token value 211 is then provided back to the packet generator 210 where it is added to the test packet. The tokenized test packet is then ready to be provided as one of the tokenized test packets 216 that is sent to the second test packet co-processor 206. It is noted that the application layer token data 212, the non-application layer content 215, and the flow table 214 can be stored within a data storage system associated with the first test packet co-processor, if desired, such as a cache memory associated with the first test packet co-processor 204. It is further noted that the flow table can include data associated with network communication sessions, such as source IP (internet protocol) address information, destination IP address information, source port information, and/or destination port information.

The second test packet co-processor 206 includes token parser and packet formatter 218. The token parser and packet formatter 218 analyzes test packets 216 received from the first test packet co-processor 204. If a application layer token value is included within a test packet, the second test packet co-processor replaces the token value with stateful application layer content. In particular, the second test packet co-processor uses a token value 221 to access stateful application layer content 224 within a data storage system 208. This stateful content 222 is then received by the second test packet co-processor 206. The token parser and packet formatter 218 then replaces the token value within the test packet with the actual application layer content to form an application layer test packet. The final application layer test packet is then transmitted as one of the application layer test packets 220 to the communication network. It is noted that the stateful application layer content 224 can be stored in a data storage system 208 that is external to the co-processor 218, if desired. For example, external main memory circuitry can be utilized for data storage system 208. It is further noted that the data storage system 208 could also be implemented, if desired, using a cache memory associated with the second co-processor 206 instead of or in combination with an external data storage system.

Advantageously, by tokenizing the test packets to include a token value representing desired stateful application layer content, rather than inserting the content itself, the first co-processor 204 can generate a high volume of tokenized test packets. The OSI Layer 1-6 content is typically far smaller in size than the OSI Layer 7 payload content that is being included within an application layer test packet. As such, the tokenized packets 216 can be much smaller than the completed application layer test packets 220. This reduction in size allows for the first co-processor 204 to generate significantly larger numbers of test packets within a given amount of time for the communication sessions being tracked in the flow table 214. The second test packet co-processor can then be dedicated to the task of replacing the application layer token value with the stateful application layer content desired for the resulting application layer test packets 220. The token recognition and content swapping operation can occur at very high speeds so that the number of application layer test packets 220 generated for communication system testing can reach high data rates, such as data rates of 400 gigabits-per-second (Gbps) or more.

Figure 3:
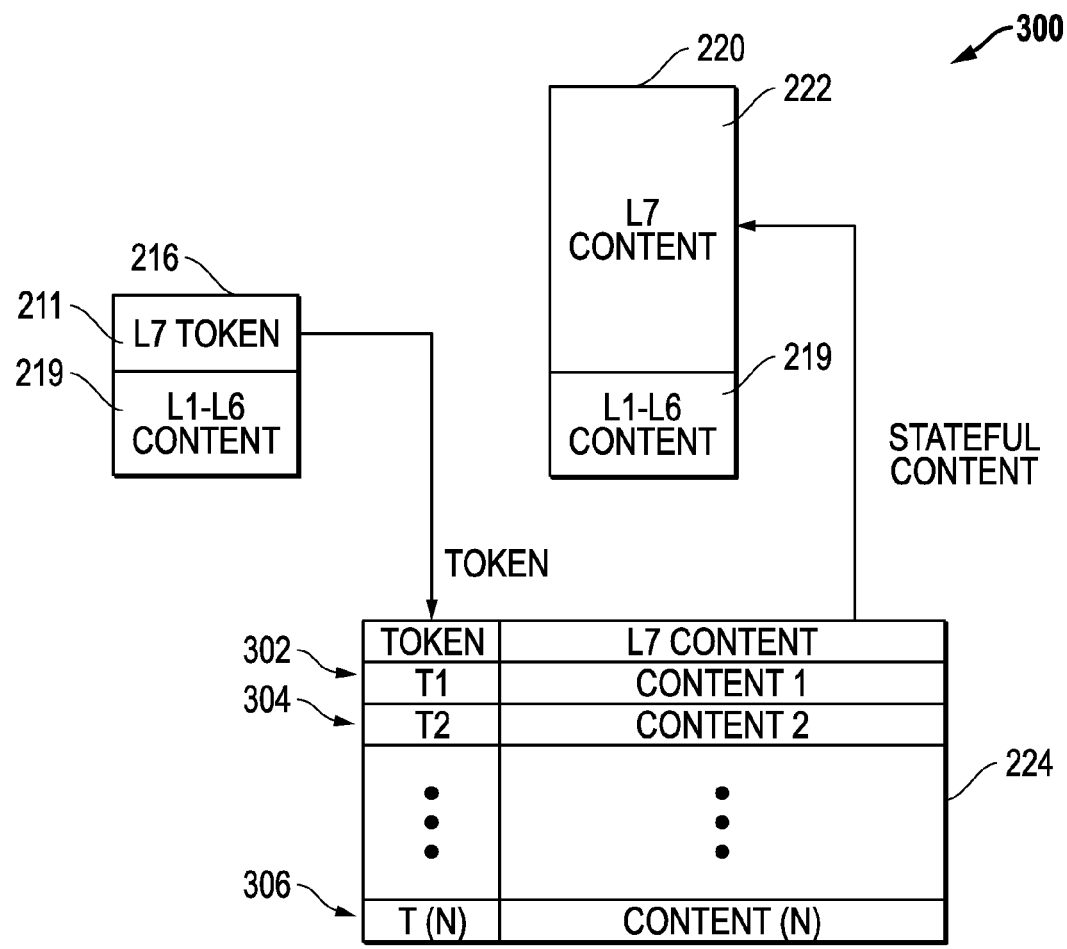
FIG. 3 is a block diagram of an embodiment for replacement of token values with stateful application layer content.

FIG. 3 is a block diagram of an embodiment 300 for replacement of token values with application layer content. As depicted, the stateful application layer content 224 is represented by a data table that includes a column for token values and a column for associated OSI Layer 7 content. A plurality of rows 302, 304 . . . 306 of data can be stored. As depicted, a first row 302 includes a first token value (TOKEN1) that is associated with a first payload content (CONTENT1) for application layer content. A second row 304 includes a second token value (TOKEN2) that is associated with a second payload content (CONTENT2) for application layer content. Further, an Nth row 306 includes an Nth token value (TOKEN(N)) that is associated with an Nth payload content (CONTENT(N)) for application layer content. It is noted that the L7 content can be different sizes and types of data for different rows, as desired, depending upon the types of application layer test packets that are desired to be generated.

During operation, a tokenized test packet 216 is processed to swap stateful application layer content 222 for token values 211. In particular, a tokenized test packet 216 includes content associated with one more non-application OSI Layers, as represented by L1-L6 content 219. The tokenized test packet 216 also includes a token value 211 related to the desired OSI Layer 7 content to be later added to the test packet. The table 224 is then used to identify stateful content associated with the L7 token value. The stateful content 222 is then loaded as the application layer payload data into the final application layer test packet 220.

Figure 4:
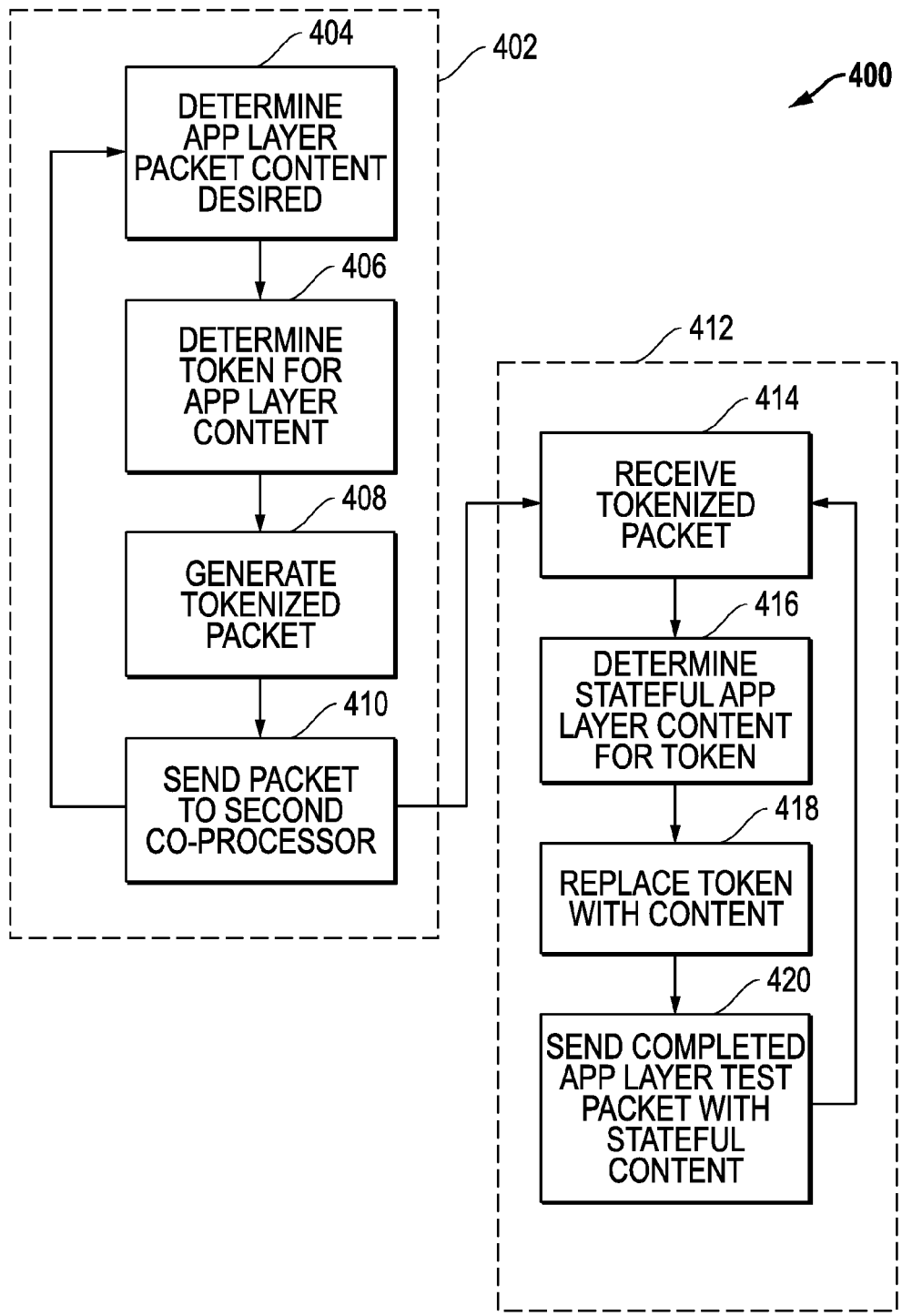
FIG. 4 is a process flow diagram of an embodiment for tokenizing application layer test packets and forming completed application layer test packets with stateful application layer content.

FIG. 4 is a process flow diagram of an embodiment 400 for tokenizing application layer test packets and forming completed application layer test packets with stateful application layer content. A first packet co-processor performs the process steps within dashed line 402, and a second packet co-processor performs the process steps within dashed line 412. In block 404, a determination is made with respect to application layer packet content that is desired for an application layer test packet. In block 406, the token value for the desired application layer content is determined. In block 408, a tokenized packet is generated that includes the token value. In block 410, the completed test packet is sent to the second network test packet co-processor and flow passes to block 414. For the first packet co-processor, flow then proceeds back to block 404 where additional tokenized network test packets are generated.

In block 414, the second network test packet co-processor receives the tokenized packet from the first network test packet co-processor. In block 416, the stateful application layer content associated with the token value is determined. In block 418, the token value is replaced with the stateful application layer content to form a completed application layer test packet. In block 420, the completed application layer test packet with the stateful content is forwarded on for use in application layer testing of the communication system. For the second packet co-processor, flow then proceeds back to block 414 where additional tokenized network test packets are processed to swap in stateful content for the token values to form completed application layer test packets.

Figure 5:
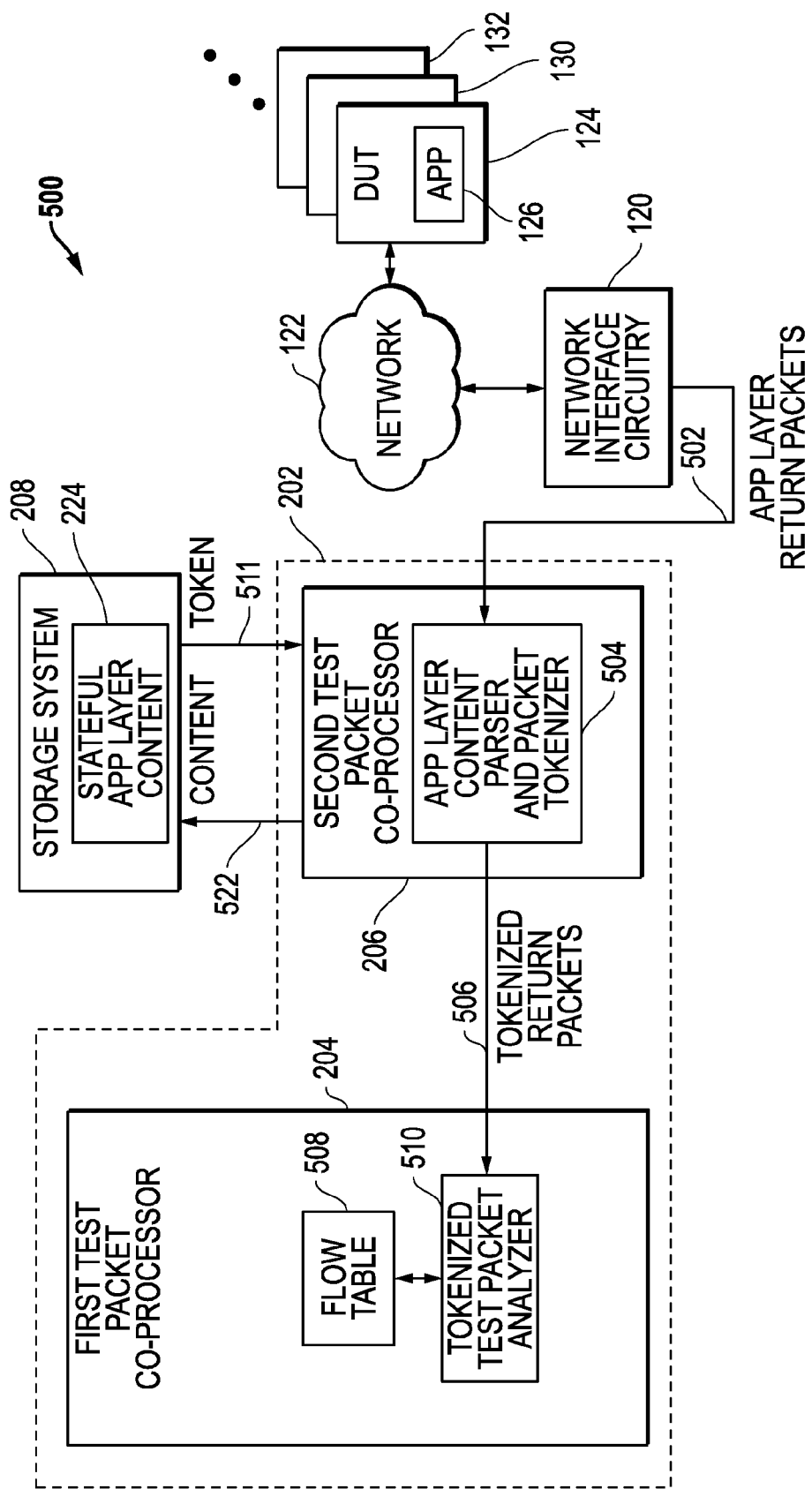
FIG. 5 is a block diagram of an embodiment showing return test packets within the communication system that are received back by the multi-stage test packet generator.

FIG. 5 is a block diagram of an embodiment 500 showing return test packets 502 within the communication system that are received back from the DUTs 124, 130, and 132. During test operations, the application layer test packets 216 are received and processed by the DUTs, and the DUTs generate return test packets that are sent back through the communication network. As depicted application layer return packets 502 are being received from DUTs 124, 130, and 132 through the network 122 and the network interface circuitry 120. These application layer return packets 502 are received and processed by the multi-stage test packet processor 202. Based upon the application layer content being received back in these return packets, the multi-stage packet processor 202 can determine additional application layer test packets to generate and can generate these test packets as described above.

For the receive operation, the second test packet co-processor 206 first receives the application layer return packets 502. Using the application layer content parser and packet tokenizer 504, the second test packet co-processor 206 determines if the return application layer content has an associated token value. In particular, the application layer content 522 is used to check the stateful application layer content table 224 within the storage system 208 to determine if a token value is associated with the content. If there is an associated token value, this associated token value 511 is received by the application layer content parser and packet tokenizer 504, which then replaces the application layer content within the return packet with the associated token value. The tokenized return packets 506 are then provided back to the first test packet co-processor 204. A tokenized test packet analyzer 510 within the first test packet co-processor 204 then analyzes the tokenized return packets and adjusts the flow table 508 accordingly to keep track of the current state of communication sessions within the communication network being tested. If additional application layer test packets are needed, they are generated as described above by the two-stage test packet processor 202.

Figure 6:
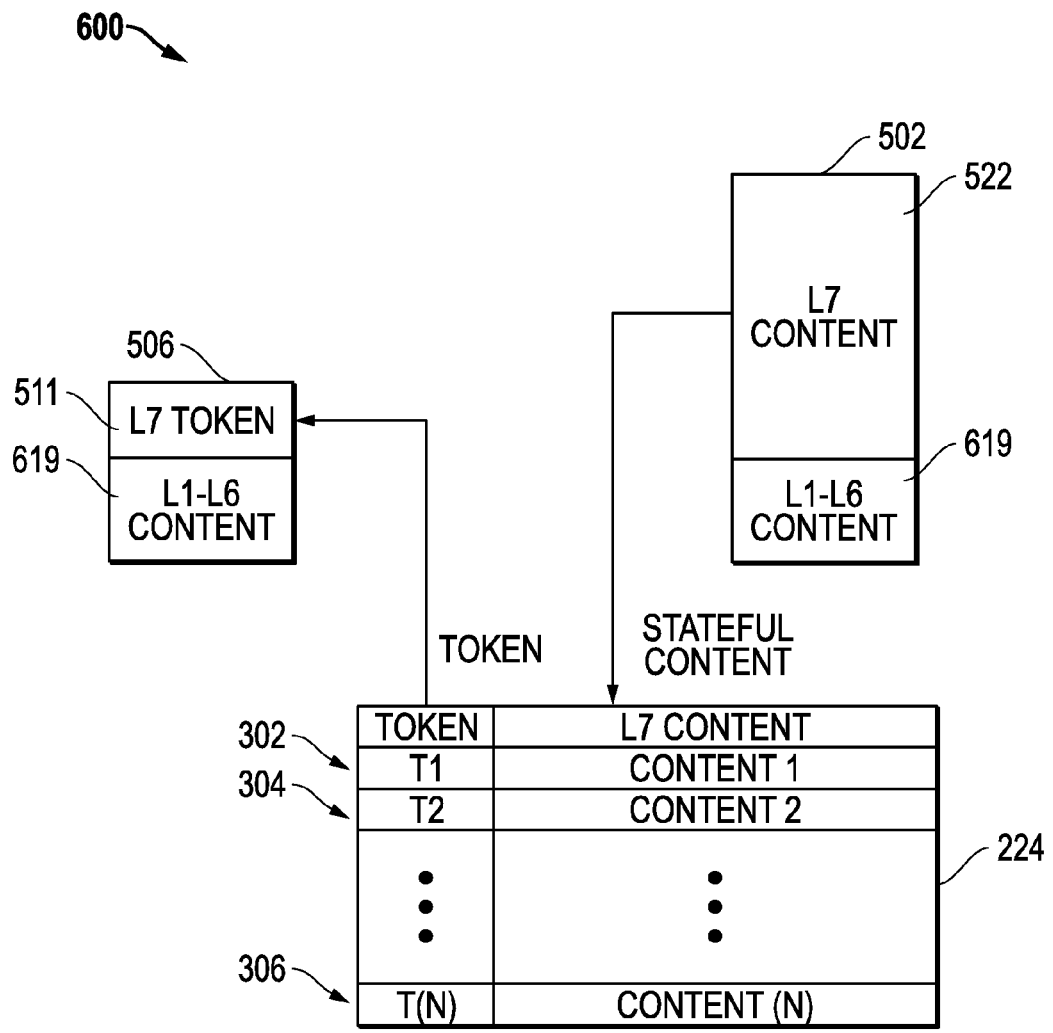
FIG. 6 is a block diagram of an embodiment for replacement of application layer content with token values within return packets.

FIG. 6 is a block diagram of an embodiment 600 for replacement of application layer content with token values within the return packets. As depicted, the stateful application layer content 224 is again represented by a data table that includes a column for token values and a column for associated OSI Layer 7 content. A plurality of rows 302, 304 . . . 306 of data can be stored. As again depicted, a first row 302 includes a first token value (TOKEN1) that is associated with a first payload content (CONTENT1) for application layer content. A second row 304 includes a second token value (TOKEN2) that is associated with a second payload content (CONTENT2) for application layer content. Further, an Nth row 306 includes an Nth token value (TOKEN(N)) that is associated with an Nth payload content (CONTENT(N)) for application layer content. It is again noted that the L7 content can be different sizes and types of data for different rows, as desired, depending upon the types of application layer test packets that are desired to be generated.

During operation, a application layer return packet 502 is processed to replace stateful application layer content 522 with an associated token value 511. In particular, an application layer return packet 502 includes content associated with one more non-application OSI Layers, as represented by L1-L6 content 619. The application layer return packet 502 also includes stateful application layer content 522 related to OSI Layer 7 content. The table 224 is then used to identify any L7 token values associated with stateful L7 content. Once identified, the stateful content 522 within the application layer return packet 502 is replaced with the token value 511 to form tokenized return packet 506.

Figure 7:
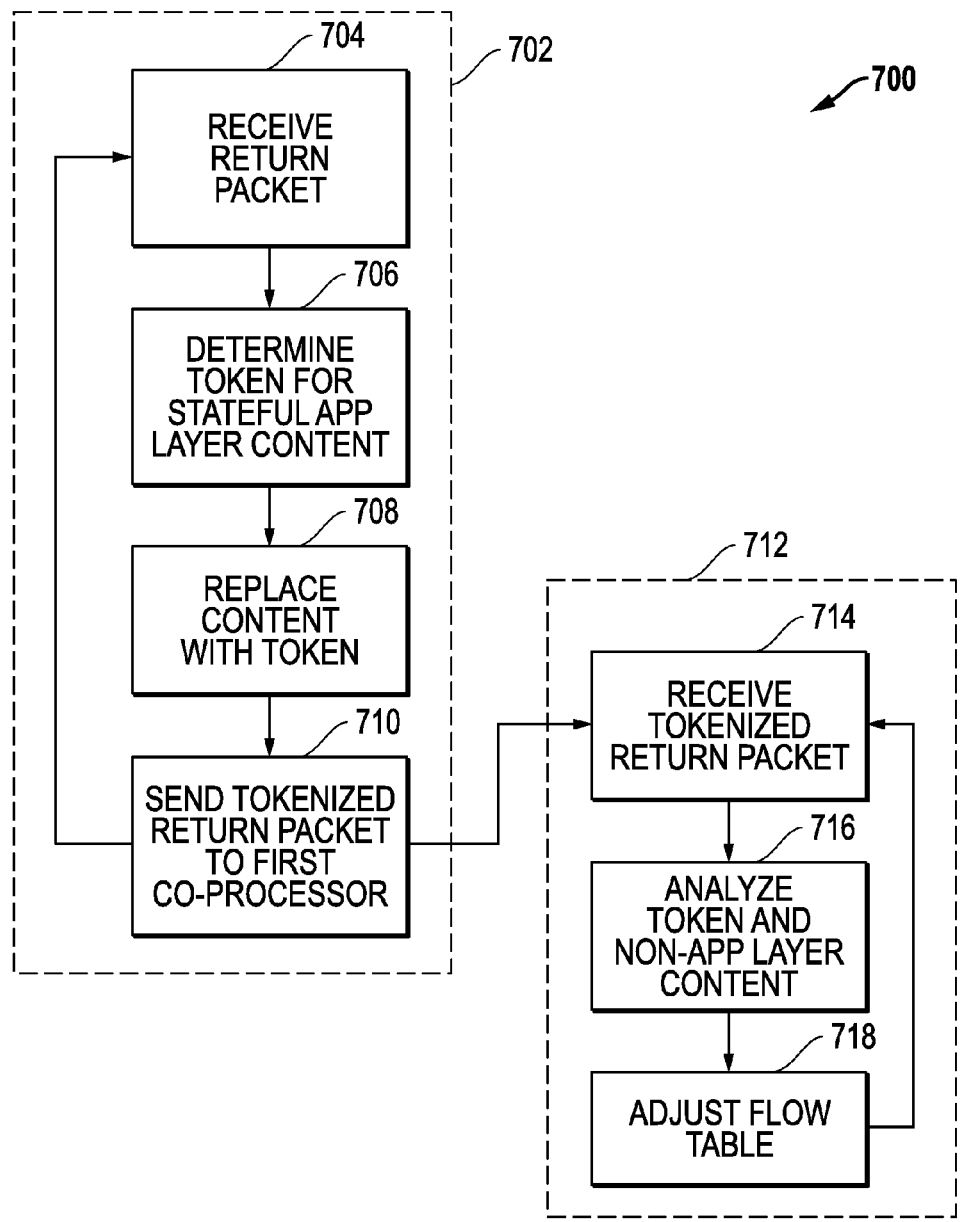
FIG. 7 is a process flow diagram of an embodiment for processing application layer return packets with stateful application layer content and forming tokenized application layer return packets.

FIG. 7 is a process flow diagram of an embodiment 700 for processing application layer return packets with stateful application layer content and forming tokenized application layer return packets. The second packet co-processor described above performs the process steps within dashed line 702, and the first packet co-processor described above performs the process steps within dashed line 712. In block 704, the second network test packet co-processor receives an application layer return packet. In block 706, a token value associated with the stateful application layer content within the return packet is determined. In block 708, the stateful application layer content is replaced with the token value to form a tokenized application layer return packet. In block 710, the tokenized return packet is provided to the first co-processor and flow passes to block 714. For the second packet co-processor, flow then proceeds back to block 704 where additional application layer return packets are processed to swap in token values for stateful content to form tokenized application layer return packets.

In block 714, the first co-processor receives the tokenized return packet from the second co-processor. In block 716, the first co-processor analyzes the token value and the non-application layer content for the tokenized return packet. In block 718, the flow table is adjusted accordingly based upon the analysis of the token value and the non-application layer content. For the first packet co-processor, flow then proceeds back to block 714 where additional tokenized return packets are analyzed. Further, the first test packet co-processor can generate additional tokenized test packets, as described above.

It is noted that certain embodiments could be configured such that application layer return packets 502 are not tokenized prior to being processed by the first test packet co-processor 204. For example, looking back to FIG. 5, it is noted that the application layer content parser and packet tokenizer 504 could be removed from the second test packet co-processor 206, if desired, so that the application layer return packets 502 are not tokenized. Such an embodiment may be useful where the first test packet co-processor 204 supports asymmetric bandwidth allocation. For example, some processors that could be utilized as the first test packet co-processor 204 may be configured to have limited bandwidth allocation capabilities, such as allocating a full bandwidth for ingress traffic only (e.g., 100 gigabit ingress only traffic), allocating a full bandwidth for egress traffic only (e.g., 100 gigabit egress only traffic), or a split bandwidth for ingress/egress traffic (e.g., 50 gigabit in each direction for bidirectional traffic). However, other processors that could be utilized as the first test packet co-processor 204 may be configured to have adjustable bandwidth allocation capabilities, such as allocating a desired percentage of full bandwidth to ingress traffic and allocating the remainder to egress traffic or allocating a desired percentage of full bandwidth to egress traffic and allocating the remainder to ingress traffic.

For a network test system embodiment, therefore, that generated tokenized application layer test packets 216 but did not tokenize the application layer return packets 502, the total bandwidth for the first test packet co-processor 204 could be partitioned such that egress traffic for sending the tokenized test packets 216 would use a much smaller amount of total bandwidth (e.g., 10% of total bandwidth) than would be used for receiving return packets (e.g., 90% of total bandwidth). Using the second test packet co-processor 206, however, the relatively small bandwidth of egress tokenized test packet traffic being generated and output by the first test packet co-processor 204 and can be received and expanded to near full line-rate through the de-tokenization within the second test packet co-processor 204, while reserving enough ingress traffic bandwidth for the first test packet co-processor 204 to absorb the effective return test packet traffic load being received by the network test system. It is further noted the second test packet co-processor 206 can be configured to include a bandwidth monitor that monitors and helps shape the ingress/egress bandwidths for the first test packet co-processor 204. For example, such a bandwidth monitor can monitor total bandwidth utilized on the connection to the first test packet co-processor 204 and provide control signals to cause the first test packet co-processor 204 to back off transmit traffic (e.g., applying back-pressure to the first co-processor) if the allocated receive/ingress bandwidth for the first test packet co-processor 204 is causing traffic to back up.

Figure 8:
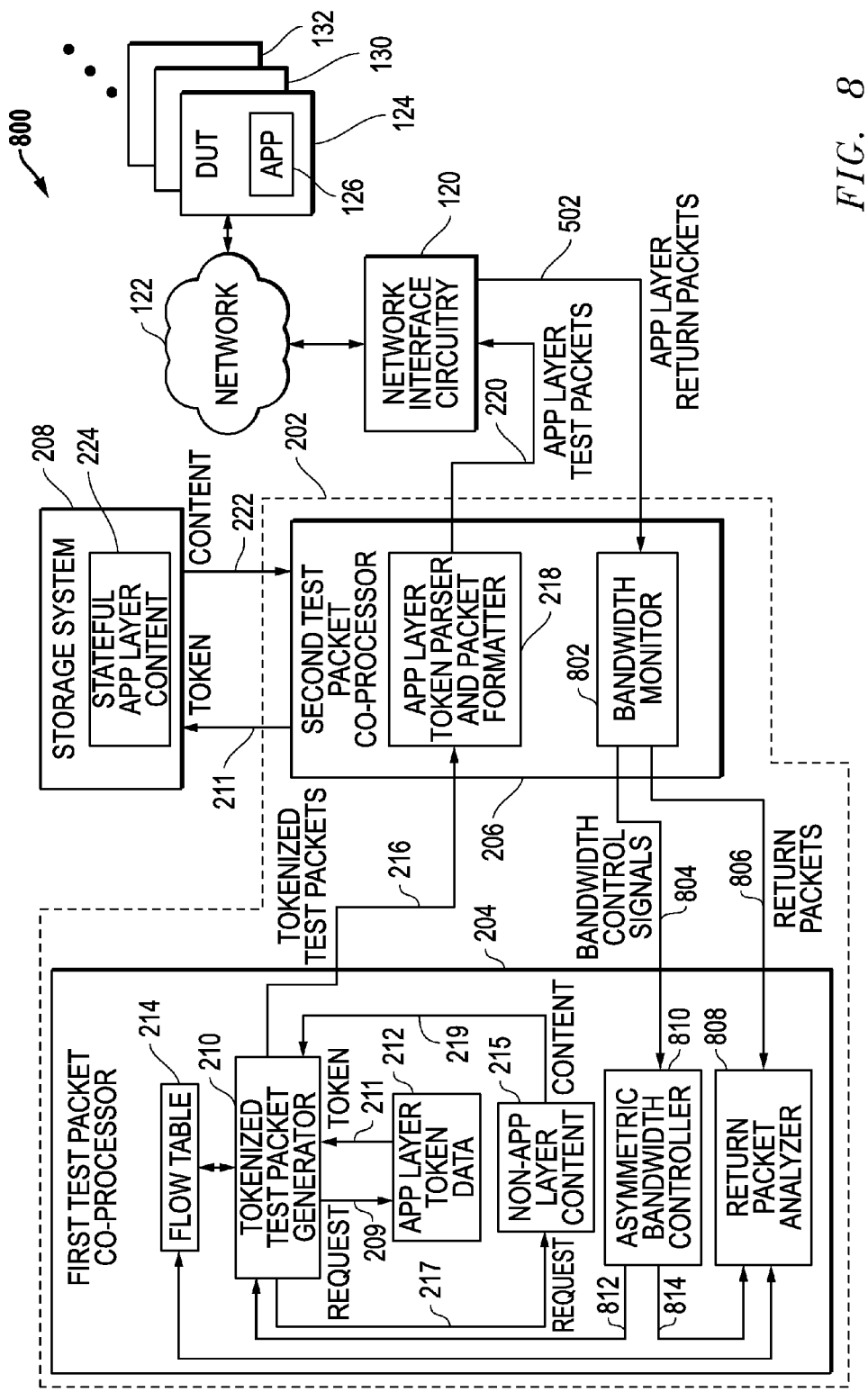
FIG. 8 is a block diagram of an embodiment for a network test system that utilizes a bandwidth monitor and an asymmetric bandwidth controller to adjust ingress/egress bandwidth associated with test packet generation and return test packet processing.

FIG. 8 is a block diagram of an embodiment 800 for a network test system that utilizes a bandwidth monitor 802 and an asymmetric bandwidth controller 810 to control bandwidths for test packet generation and return test packet processing. In particular, for the embodiment 800 depicted, the first test packet co-processor includes an asymmetric bandwidth controller 810 that allows the first test packet co-processor to control the amount of its total bandwidth used for outgoing or egress bandwidth, which is used to provide the tokenized test packets 216, and the amount of total bandwidth used for incoming or ingress bandwidth, which is used to receive the return packets 806. Further, for the embodiment 800 depicted, the second test packet co-processor 206 is not tokenizing the application layer return packets 502. Rather, these packets are provided as return packets 806 to the return packet analyzer 808 within the first test packet co-processor 204 without tokenization. The return packet analyzer 808, which is also coupled to the flow table 214, analyzes and processes these return packets 806 with respect to the session information stored in the flow table 214. Additional tokenized test packets 216 can then be generated by the tokenized test packet generator 210, as desired.

As also depicted for embodiment 800, second test packet co-processor 206 includes a bandwidth monitor 802. The bandwidth monitor 802 is configured to monitor the ingress and egress bandwidth for the connections between the first test packet co-processor 204 and the second test packet co-processor 206. For example, the bandwidth monitor 802 is configured to monitor the traffic for the tokenized test packets 216 being received by the second co-processor 206 from the first co-processor 204, and the bandwidth monitor 802 is configured to monitor the traffic for the return packets 806 being sent from the second co-processor 206 to the first co-processor 204. If an adjustment is desired to the ingress/egress bandwidths for the first test packet co-processor 204, the bandwidth monitor 802 sends bandwidth control signals 804 to the asymmetric bandwidth controller 810 to indicate the appropriate adjustments. The asymmetric bandwidth controller 810 then adjusts the egress/ingress processing accordingly though control signals 812 applied to the tokenized test packet generator 210 and control signals 814 applied to the return packet analyzer 808. For example, if the traffic for the return packets 806 becomes backed-up, the bandwidth monitor 802 can provide bandwidth control signals 804 to the asymmetric bandwidth controller 810, which in turn can adjust control signals 812 and 814, so that the egress bandwidth used for forwarding tokenized test packets 216 is reduced, and so that ingress bandwidth used for receiving return test packets 806 is increased. Once traffic flow backups are reduced, the bandwidth monitor 802 and asymmetric bandwidth controller 801 can adjust the ingress/egress bandwidths back to there original levels, if desired. Other variations could also be implemented, as desired, to provide asymmetric processing by the first test packet co-processor 204.

It is noted that the application layer test packet generation and transmission described with respect to FIGS. 2-4 and the return packet reception and processing described with respect to FIGS. 5-7 would typically be simultaneous or concurrent operations. In other words, the multi-stage test packet processor 202 will typically operate to both send application layer test packets and receive application layer return packets so as to emulate one or more application layer communication sessions within the communication system being tested. For example, as described with respect to FIG. 8, the multi-stage test packet processor 202 both generates application layer test packets and processes returned application layer test packets. Other variations and embodiments could be implemented as desired.

It is further noted that the tokenization of the return packets may be skipped, if desired. For example, for certain selected content payloads within the application layer return packets, the actual application layer content can be sent to the first co-processor rather than sending a token representing that content. In this way, payloads of particular interest can be selected and forwarded on the first co-processor for more detailed analysis, if desired.

To facilitate the determination of application layer return packets that were based upon tokenized application layer test packets, a portion of the packets can be used to indicate if they have been tokenized or previously been tokenized. As one example, a field within the test packets and return packets can include a flag that indicates whether or not the test packet or return packet had originally been tokenized. Further, such a field could be appended to the end of the rest packet and/or return packet, if desired. Another alternative to indicate tokenized packets is to use IP addresses, such as destination IP addresses, to indicate whether or not test packets or return packets have been previously tokenized. A still further alternative is to provide a copy of the flow table from the first co-processor to the second co-processor and to include indications with the flow table of packet types and/or content that are being tokenized. For example, each flow record could include an indication of whether or not test packets and/or return packets are being tokenized.

With respect to token values used for the tokenized packets, it is noted that a wide variety of techniques could be used to generate token values. For example, the token values could be generated using an algorithmic data generation routine, such as a random sequence generator, a pseudo-random number generator, a counter, and/or using some other desired algorithm or routine to generate token values for the tokenized packets.

It is also noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, programmable integrated circuitry can also be used, such as FPGAs (field programmable gate arrays), ASICs (application specific integrated circuits), and/or other programmable integrated circuitry. In addition, one or more processors running software or firmware could also be used, as desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, programmable circuitry (e.g., FPGAs), and/or processors to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU, controller, microcontroller, processor, microprocessor, or other suitable processing circuitry.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for generating test packets including stateful application layer content, comprising:
   generating a tokenized test packet using a first co-processor within a multi-stage test packet processor, the first co-processor determining stateful application layer content desired for an application layer test packet, identifying a token value associated with the desired stateful application layer content, and inserting the token value into a test packet to form the tokenized test packet, the tokenized test packet comprising non-application layer content and the token value representing the desired stateful application layer content;
   forwarding the tokenized test packet to a second co-processor within the multi-stage test packet processor;
   receiving the tokenized test packet at the second co-processor;
   forming an application layer test packet using the second co-processor to replace the token value within the tokenized test packet with stateful application layer content associated with the token value;
   repeating the generating and forwarding steps at the first co-processor to generate a plurality of tokenized test packets;
   repeating the receiving and forming steps at the second co-processor to form a plurality of application layer test packets; and
   forwarding the application layer test packets from the second co-processor to one or more devices under test within a communication system.

2. The method of claim 1, further comprising using the application layer test packets to emulate application layer activity in the communication system.

3. The method of claim 1, further comprising utilizing the second co-processor to examine the token value, to use the token value to identify stateful application layer content stored within a data storage system and associated with the token value, and to obtain the stateful application layer content from the data storage system.

4. The method of claim 3, wherein the data storage system comprises memory circuitry external to the second co-processor.

5. The method of claim 1, further comprising utilizing the first co-processor to maintain a flow table, the flow table comprising information concerning active communication sessions for the communication system.

6. The method of claim 5, wherein the flow table is stored within a cache memory for the first co-processor.

7. The method of claim 1, further comprising receiving at the second co-processor return test packets from the one or more devices under test within the communication system, the return test packets comprising stateful application layer content and non-application layer content.

8. The method of claim 7, further comprising generating tokenized return test packets using the second co-processor by replacing stateful application layer content with token values representing the stateful application layer content, and forwarding the tokenized return test packets to the first co-processor.

9. The method of claim 8, further comprising analyzing the tokenized return test packets with the first co-processor, and generating further tokenized test packets based upon the tokenized return test packets.

10. The method of claim 8, further comprising forwarding one or more of the return test packets to the first co-processor without replacing the stateful application layer content with a token value.

11. The method of claim 7, further comprising sending the return test packets to the first co-processor, analyzing the return test packets with the first co-processor, and generating further tokenized test packets based upon the return test packets.

12. The method of claim 11, further comprising monitoring packet traffic between the first co-processor and the second co-processor and adjusting ingress and egress bandwidths for the first co-processor based upon the monitoring step.

13. The method of claim 12, wherein the monitoring step is performed in the second co-processor, and further comprising providing bandwidth control signals from the second co-processor to the first co-processor and utilizing the bandwidth control signals within the first co-processor to adjust the ingress and egress bandwidths for the first co-processor.

14. The method of claim 13, further comprising increasing the ingress bandwidth for the first co-processor and decreasing the egress bandwidth for the first co-processor if receive packet traffic for the first co-processor is determined to be backed-up.

15. A system for generating test packets including application layer content, comprising:
a first co-processor within a multi-stage test packet processor configured to determine stateful application layer content desired for application layer test packets, to identify token values associated with the desired stateful application layer content, to insert the token values into test packets to form the tokenized test packets including non-application layer content and the token values representing the desired stateful application layer content, and to forward the tokenized packets to a second co-processor within the multi-stage test packet processor; and
the second co-processor configured to form application layer test packets by replacing the token values with stateful application layer content associated with the token values and to forward the application layer test packets to one or more devices under test within a communication system.

16. The system of claim 15, wherein the second co-processor is further configured to use the application layer test packets to emulate application layer activity in the communication system.

17. The system of claim 15, wherein the second co-processor is further configured to examine the token values, to use the token values to identify stateful application layer content stored within a data storage system and associated with the token values, and to obtain the stateful application layer content from the data storage system.

18. The system of claim 17, wherein the data storage system comprises memory circuitry external to the second co-processor.

19. The system of claim 15, wherein the first co-processor is further configured to maintain a flow table, the flow table comprising information concerning active communication sessions for the communication system.

20. The system of claim 19, wherein the flow table is stored within a cache memory for the first co-processor.

21. The system of claim 15, wherein the second co-processor is further configured to receive return test packets from the one or more devices under test within the communication system, the return test packets comprising stateful application layer content and non-application layer content.

22. The system of claim 21, wherein the second co-processor is further configured to generate tokenized return test packets by replacing stateful application layer content with token values representing the stateful application layer content and to forward the tokenized return test packets to the first co-processor.

23. The system of claim 22, wherein the first co-processor is further configured to analyze the tokenized return test packets and to generate further tokenized test packets based upon the tokenized return test packets.

24. The system of claim 22, wherein the second co-processor is further configured to forward one or more of the return test packets to the first co-processor without replacing the stateful application layer content with a token value.

25. The system of claim 21, wherein the second co-processor is further configured to send the return test packets to the first co-processor, and wherein the first co-processor is further configured to analyze the return test packets and to generate further tokenized test packets based upon the return test packets.

26. The system of claim 25, wherein the first co-processor is further configured to adjust ingress and egress bandwidths for the first co-processor based upon packet traffic levels between the first co-processor and the second co-processor.

27. The system of claim 26, wherein the second co-processor is further configured to monitor the packet traffic levels between the first co-processor and the second co-processor and to provide the bandwidth control signals to the first co-processor.

28. The system of claim 27, wherein the second co-processor is configured to provide bandwidth controls signals to cause the ingress bandwidth for the first co-processor to be increased and to cause the egress bandwidth for the first co-processor to be decreased if receive packet traffic for the first co-processor is determined to be backed-up.

* * * * *